Figure 1:
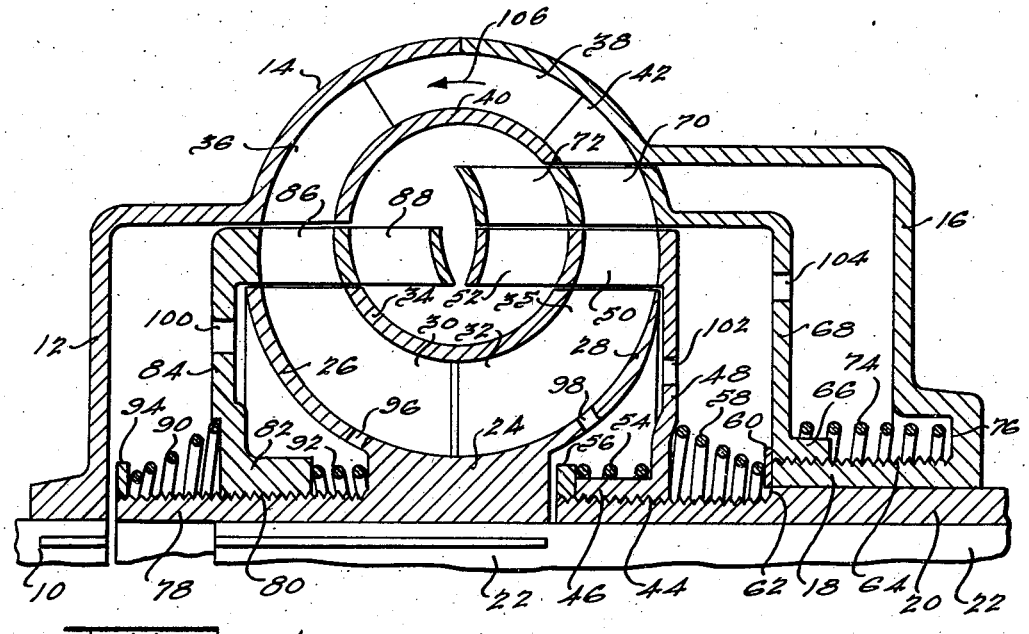

Jan. 22, 1946.　　　　J. JANDASEK　　　　2,393,470
FLUID TRANSMISSION
Filed Aug. 28, 1943

INVENTOR.
Joseph Jandasek.
BY
A. E. Wilson
ATTORNEY.

Patented Jan. 22, 1946

2,393,470

UNITED STATES PATENT OFFICE 2,393,470

FLUID TRANSMISSION

Joseph Jandasek, Highland Park, Mich., assignor to Bendix Aviation Corporation, South Bend, Ind., a corporation of Delaware Application August 28, 1943, Serial No. 500,309

5 Claims. (Cl. 60—54)

This invention relates to transmissions and more particularly to fluid transmissions adapted to automatically operate as torque converters or as fluid clutches depending on the load to which the device is subjected.

An object of the invention is to provide a fluid transmission having auxiliary fluid energizing, energy absorbing and reaction members capable of augmenting the power transmitting characteristics of main fluid energizing, energy absorbing and reaction members.

A further object of the invention resides in the provision of a fluid transmission having auxiliary fluid deflecting blade wheels adapted to be moved to different operating positions by variations of fluid reaction to which they are subjected in the operation of the transmissions.

Yet another object of the invention is to provide auxiliary fluid energizing and energy absorbing blade wheels having spaced bladed sections to induce operation of the transmission at maximum efficiency when the device is operating as a torque converter or as a fluid clutch.

A further object is to provide a fluid transmission having a plurality of spaced reaction members each having a plurality of fluid deflecting bladed channels adapted to be selectively introduced into a power transmitting fluid circuit to increase the efficiency of the transmission of power at varying speed and load conditions.

Yet another object resides in the provision of a fluid transmission having movable impeller guide wheel and turbine members each having spaced vaned channel portions adapted to be selectively introduced into a power transmitting fluid circuit to maintain maximum efficiency when the transmission is operating either as a torque converter or as a fluid clutch.

Another object of the invention is to provide a fluid transmission having a plurality of successively movable turbine and guide wheel members having spaced vaned channels adapted to be successively introduced into a power transmitting fluid circuit to insure the operation of the device at peak efficiency when operating as a torque converter or as a fluid clutch.

Yet a still further object of the invention resides in the provision of apertured blade wheel carrying members whereby fluid may flow therethrough to exert substantially equal pressure on opposite sides of such members to insure proper cooperation with the fluid reaction exerted on the blades to control the shifting of the blade wheel members.

Other objects and advantages of this invention will be apparent from the following detailed description considered in connection with the accompanying drawing, submitted for purposes of illustration only and not intended to define the scope of the invention, reference being had for that purpose to the subjoined claims.

Figure 2:
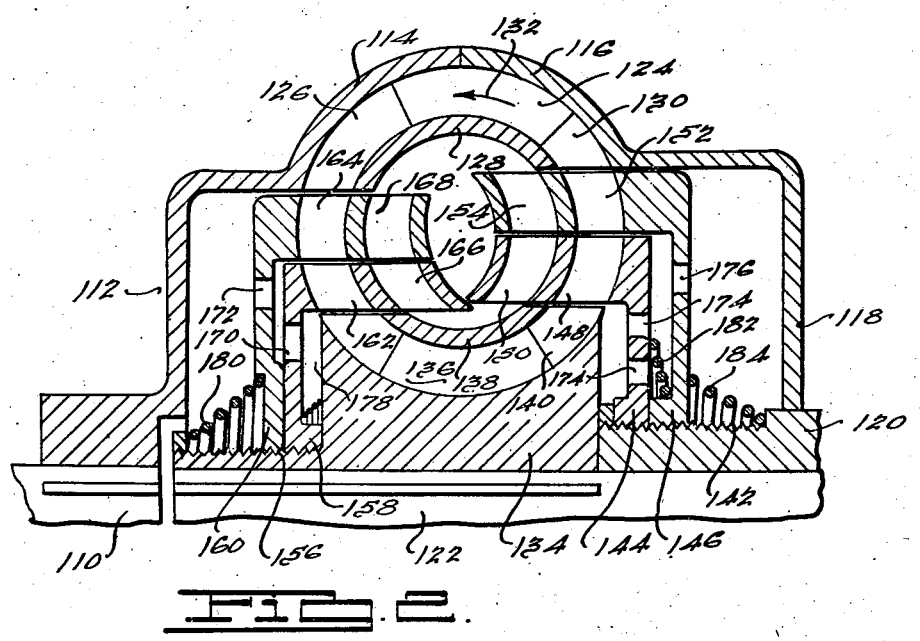

In the drawing wherein similar reference characters refer to similar parts throughout the several views:

Fig. 1 is a longitudinal sectional view of a fluid transmission illustrating one desirable embodiment of the invention, and Fig. 2 is a similar view illustrating a modified form of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways.

Referring to the embodiment of the invention illustrated in Fig. 1 it will be noted that a driving shaft 10 has thereon a flange 12 supporting an impeller housing 14 having a flange supporting a sleeve 18 surrounding a stationary member 20 sleeved on a driven shaft 22, preferably aligned with the driving shaft 10.

The driven shaft 22 has thereon a hub 24 supporting spaced webs 26 and 28 having fluid deflecting vanes 30 and 32 interposed between the webs 26 and 28 and a shroud member 34 to provide a turbine energy absorbing fluid channel 35.

The impeller housing 14 is provided with spaced impeller blades 36 and 38 interposed between spaced sections of the housing member 14 and an impeller shroud 40 to provide an impeller fluid energizing channel 42. The turbine fluid channel 35 and the impeller fluid channel 42 cooperate to provide a power transmitting fluid circuit through which fluid may be energized by the impeller and transmitted to the turbine to transfer power from the driving shaft 10 to the driven shaft 22.

The stationary member 20 supporting the driven shaft 22 is provided with a threaded portion 44 for the reception of a guide wheel hub 46 having a radially extended flange 48 provided with spaced vaned channels 50 and 52 adapted to be alternately introduced into the power transmitting fluid circuit to operate the transmission as a torque converter or as a fluid clutch depending on variations of fluid reaction to which the vanes in the channel portions 50 and 52 are subjected.

The fluid deflecting vanes in the channel portion 50 are of heavy contour and embody considerable curvature to deflect the power transmitting fluid to a considerable degree while the device is operating as a torque converter to insure the smooth flow of fluid between the turbine and the impeller when the device is transmitting large quantities of power at increased torque.

The channel 52 is provided with fluid deflecting vanes of lighter section embodying less curvature to transmit the fluid from the turbine to the impeller in such a manner as to prevent fluid turbulences when the device is operating as a fluid clutch, to transmit power with substantially no torque multiplication. A spring 54 interposed between a stop 56 carried by the hub 46 and the flange 48 is provided to yieldingly urge the guide wheel member axially of the fluid circuit to introduce the vanes in channel 52 into the fluid circuit in opposition to fluid reaction exerted therein.

A spring 58 interposed between the flange 48 and a stop member 60 abutting a shoulder 62 on the stationary member 20 serves to yieldingly urge the flange 48 axially to introduce the vanes in the channel 50 into the fluid circuit in opposition to the spring 54. The springs 54 and 58 may be calibrated with reference to the fluid reaction exerted in the fluid circuit to insure the introduction of the vanes in the channels 50 or 52 into the fluid circuit when the power transmitting characteristics are such that operation as a torque converter or as a fluid clutch is demanded. Under the action of their opposed springs alone, the axially movable members 48, 68 and 84 will assume the position in which they are shown in Fig. 1.

The sleeve 18 on the housing 14 surrounding the stationary member 20 is provided with threads 64 for the reception of an auxiliary impeller hub 66 having a radially extended flange 68 supporting spaced auxiliary impeller channels 70 and 72. The impeller channel 70 is provided with fluid deflecting vanes of large section embodying considerable curvature. The circulating fluid strikes these vanes on their faces and they direct the fluid in the desired direction to induce it to enter the impeller channel 42 with minimum turbulence. These vanes in some instances absorb energy from the circulating fluid thereby energizing the impeller when the device is operating as a torque converter.

The channel 72 is provided with fluid deflecting vanes of smaller section embodying less curvature to impart a desired amount of energy to the circulating fluid when the device is operating as a fluid clutch with the vanes in the channel 72 introduced into the power transmitting fluid circuit.

A spring 74 interposed between the flange 68 and a portion 76 of the flange 16 of the impeller housing 14 serves to yieldingly urge the vanes in the channel 70 into the fluid circuit in opposition to fluid reaction in the circuit acting on the vanes.

The turbine hub 24 has an extended section 78 having threads 80 for the reception of an auxiliary turbine hub 82 having a flange 84 supporting spaced fluid deflecting channels 86 and 88 adapted to be introduced into the power transmitting fluid circuit when the device is operating as a torque converter or as a fluid clutch. The channel 86 has therein auxiliary turbine vanes of relatively large contour embodying considerable curvature to absorb a considerable proportion of energy from the power transmitting fluid when the device is operating as a torque converter.

The channel 88 has therein smaller fluid deflecting vanes of less curvature to absorb a lesser degree of power from the fluid when the device is operating as a fluid clutch.

Opposed springs 90 and 92 interposed between a stop 94 carried by the axially extended portion 78 of the hub 24 and the flange 84, and between the hub 82 and turbine hub 24 respectively serve to yieldingly urge the channels 86 and 88 axially to interpose the desired channel into the fluid circuit when the device is operating as a torque converter or as a fluid clutch respectively.

The turbine webs 26 and 28 are provided with orifices 96 and 98 to permit fluid to pass therethrough so as to substantially equalize pressures on opposite sides of web portions. The auxiliary turbine flange 84 is provided with spaced orifices 100 to permit fluid to flow there-through to substantially equalize fluid pressures on opposite sides of the flange 84 so as to insure the desired operation of the auxiliary turbine member, the axial movement of the flange 84 from its Fig. 1 position during a static condition of the transmission to a position adjacent the housing 12 during the operation of the transmission as a fluid clutch. The guide wheel flange 48 has spaced orifices 102, and the auxiliary impeller flange 68 has spacer orifices 104 so as to insure substantially equalizations of fluid pressures on opposite sides of the flanges 48 and 68 respectively and also to insure the desired operating characteristics of the guide wheel and auxiliary impeller members.

The operation of this embodiment of the invention is as follows: Power applied to the driving shaft 10 rotates the impeller housing 14 whereupon the impeller vanes 36 and 38 energize the power transmitting fluid and move it in the direction of the arrow 106. It will be noted that a substantially axial flow type impeller is embodied, however any type impeller such for example as the radial flow type may be employed.

When the device is operating as a torque converter with the auxiliary impeller and turbine members and the guide wheel member in the position illustrated, fluid discharged from the impeller channel 42 flows into the auxiliary turbine channel 86 whereupon a portion of the power is absorbed and transmitted through the auxiliary turbine hub 82 and threaded extension 78 to the turbine hub 24 fixed to the driven shaft 22.

After flowing through the auxiliary turbine channel 86 the fluid is directed through the main turbine channel 35 whereupon energy is imparted to the turbine vanes 30 and 32 and transmitted therefrom to the driven shaft 22. After leaving the main turbine channel 35 the power transmitting fluid passes through the guide wheel channel 50 whereupon it is deviated so as to enter the auxiliary impeller channel 70 in such a manner as to minimize turbulence and permit the transmission of power with torque multiplication.

Under certain operating conditions the fluid entering the auxiliary impeller channel 70 impinges on the faces of the impeller vanes whereupon power is absorbed therein and the fluid is redirected to enter the main impeller channel 42 in such a manner as to minimize turbulence.

As the load to which the driven shaft 22 is subjected decreases, or the power applied to the driving shaft 10 increases to such a point that torque multiplication is unnecessary to carry the load, the auxiliary impeller and turbine members and guide wheel member are shifted automatically to introduce the channeled impeller turbine and guide wheel channels 72, 86 and 52 respectively into the power transmitting fluid circuit.

It will be noted that the apertures 96 and 98 in the turbine web members 26 and 28 respectively permit the flow of a predetermined quantity of fluid therethrough, and the apertures 100 and 102 in the auxiliary turbine carrying member 84 and in the guide wheel carrying member 48 respectively permit the flow of fluid through the members whereupon substantially equal fluid pressures are exerted on opposite sides of said members. The apertures 104 in the auxiliary impeller carrying member 68 also permits predetermined quantities of fluid to pass therethrough to subject the radially extended auxiliary impeller carrying member 68 to substantially equal pressures on opposite sides thereof. It will be apparent that if desired the apertures may be varied in size to permit the flow of a controlled quantity of fluid through the auxiliary turbine and impeller members and the guide wheel member to subject said members to a predetermined force urging the auxiliary impeller turbine and guide wheel channeled portions 72, 82 and 52 into the power transmitting fluid circuit.

With the auxiliary impeller and turbine channeled portions 72 and 88 and the guide wheel channeled portion 52 positioned in the power transmitting fluid circuit, power is transmitted from the driving shaft 10 to the driven shaft 22 with virtually no torque multiplication. The vane members in these channeled portions are of relatively small contour and having little curvature operate to direct the fluid to the next channeled portion in such a manner that fluid turbulence is minimized, and the transmission of power as a fluid clutch will be maintained at high efficiency.

The position of the auxiliary impeller and turbine members relative to the power transmitting fluid circuit is influenced by three forces: (1) the fluid reaction exerted on the vanes in the channeled portion positioned in the power transmitting fluid circuit; (2) the side thrust on the radially extended auxiliary impeller and turbine carrying members 68 and 84 respectively; (3) the forces exerted by the springs positioned to engage the radially extended auxiliary impeller and turbine carrying members to exert axial forces thereon.

When the device is operating as a fluid clutch and the load to which the driven shaft 22 is subjected is increased or the power applied to the driving shaft 10 is decreased, the auxiliary impeller turbine and guide wheel members are automatically subjected to forces to shift them to introduce the channeled portions 70, 86 and 50 respectively having the vanes of the appropriate contour for operation as a torque converter to permit the transmission of power with torque multiplication.

If desired a stop member carried by the main turbine web 26 may be employed to engage the auxiliary turbine hub 82 or the carrying member 84 to limit inward movement of the auxiliary turbine carrying member 84 when the device is operating as a torque converter with the channeled portion 86 positioned in the power transmitting fluid circuit.

In the embodiment of the invention illustrated in Fig. 2 a driving shaft 110 has a radially extended flange 112 supporting an impeller housing sections 114 and 116, the housing section 116 has a flange 118 embracing a stationary member 120 sleeved on a driven shaft 122 axially aligned with the driving shaft 110.

The impeller housing is provided with suitable fluid energizing vanes 124 and 126 attached to an impeller shroud 128 and cooperating therewith to form an impeller channel 130 to direct power transmitting fluid in the direction of the arrow 132 as the impeller housing sections 114 and 116 are rotated.

A turbine hub 134 is fixed to the driven shaft 122 and is provided with spaced energy absorbing vanes 136 attached to a turbine shroud 138 and cooperating therewith to form a turbine channel 140. The impeller channel 130 and the turbine channel 140 cooperate to form a power transmitting fluid circuit whereby energy may be imparted to and absorbed from a fluid to transmit power from the driving shaft 110 to the driven shaft 122.

The stationary member 120 is provided with threads 142 adapted to receive main and auxiliary guide wheel members 144 and 146 respectively. The guide wheel member 144 is provided with spaced channeled portions 148 and 150, and the auxiliary guide wheel member 146 is provided with spaced channeled portions 152 and 154 respectively. The channeled portions 148 and 152 of the main and auxiliary guide wheel members are provided with fluid deflecting blades of relatively large cross section embodying considerable curvature to vary the direction of fluid flow from the turbine to the impeller members and to permit the transmission of power with torque multiplication.

The channeled portions 150 and 154 of the main and auxiliary guide wheel members 144 and 146 respectively are provided with vanes of less cross sectional area embodying less curvature to direct the power transmitting fluid from the turbine to the impeller with less guidance whereupon power may be transmitted from the driving shaft to the driven shaft with substantially no torque multiplication when the device is operating as a fluid clutch.

The turbine hub 134 is provided with a threaded extension 156 adapted to receive a plurality of auxiliary turbine members 158 and 160. The auxiliary turbine members 158 and 160 each have fluid deflecting channeled portions 162 and 164 respectively having vanes of relatively large cross section having considerable curvature to deflect the power transmitting fluid in such a manner as to absorb considerable energy therefrom. The auxiliary turbine members 158 and 160 also have channeled portions 166 and 168 respectively having vanes of lesser cross section embodying decreased curvature to absorb a lesser amount of energy from the fluid as it circulates through the power transmitting fluid circuit.

The auxiliary turbine carrying members 158 and 160 are provided with spaced apertures 170 and 172 respectively to permit the flow of predetermined quantities of fluid through the auxiliary turbine supporting members to substantially equalize pressures on opposite sides thereof, or to create desired predetermined pressures thereon urging the channeled portions 166 and 168 into the power transmitting fluid circuit. The guide wheel carrying members 144 and 146 are also provided with spaced apertures 174 and 176 respectively to permit the flow of predetermined quantities of fluid there-through for the same purpose.

Calibrated springs 178 and 180 positioned on opposite sides of the auxiliary turbine members 158 and 160 respectively exert thereon forces tending to shift the auxiliary turbine members to position the left or right hand channeled portions in the power transmitting fluid circuit as viewed in Fig. 2. If desired a suitably calibrated spring may be positioned between the auxiliary turbine members 158 and 160. The auxiliary guide wheel members 144 and 146 are also provided with springs 182 and 184 to urge the channeled portions 148 and 152 of the guide wheel members into the power transmitting fluid circuit in opposition to fluid reaction developed in the power transmitting fluid circuit. The auxiliary guide wheel members 144 and 146 and the auxiliary turbine members 158 and 160 are positioned as shown in Fig. 2 under the action of their opposed springs alone.

The operation of this embodiment of the invention is as follows. Rotation of the driving shaft 110 is effective to energize fluid in the impeller channel 130 and move it in the direction of the arrow 132. When the device is operated as a torque converter energized fluid issuing from the impeller channel 130 flows successively into the auxiliary turbine channels 164 and 162 respectively whereupon a portion of the applied power is absorbed and is transmitted through the threaded extension 156 of the turbine hub 134 to the driven shaft 122. The remaining energy in the power transmitting fluid capable of extraction is imparted to the turbine vanes 136 and is directed through the turbine hub 134 to the driven shaft 122. Fluid issuing from the main turbine channel 140, while the device is operating as a torque converter passes successively through the main and auxiliary guide wheel channels 148 and 152 where the guide wheel vanes of large cross sectional area embodying substantial curvatures rectify the direction of fluid flow and direct it to the impeller channel 130 at the proper angle whereupon multiplied torque is transmitted to the driven shaft 122 at reduced speed.

When the load to which the driven shaft 122 is subjected decreases, or the power applied to the driving shaft 110 increases, the forces to which the auxiliary turbine members and the main and auxiliary guide wheel members are subjected due to fluid reaction exerted on the vanes, fluid pressure exerted on the turbine and guide wheel carrying members, inertia forces, and the force of the calibrated springs move the turbine and guide wheel members to introduce the channeled portions having vanes of less cross sectional area embodying less curvature into the power transmitting fluid whereupon the device is transformed to operate as a fluid clutch to transmit power from the driving shaft to the driven shaft with substantially no torque multiplication.

It will be apparent that three separate phases of operation are possible insofar as the auxiliary turbine and guide wheel members are concerned.

1. The auxiliary turbine channeled portions 164 and 162 may be positioned in the power transmitting fluid circuit when the device is operating as a torque converter to transmit high torque.

2. The auxiliary turbine member 160 may be shifted to the left as viewed in Fig. 2 to introduce the channeled portion 168 into the power transmitting fluid circuit, with the channeled portion 162 of the auxiliary turbine member 158 remaining in the fluid circuit when the device is operating as a torque converter and power is being transmitted with decreased torque multiplication.

3. The auxiliary turbine member 158 may also be shifted to the left as viewed in Fig. 2 to position the channeled portion 166 in the power transmitting fluid circuit with the channeled portion 168 of the auxiliary turbine member 160 also in the circuit when the device is operating as a fluid clutch to transmit power with substantially no torque multiplication.

Similarly the main and auxiliary guide wheel members 144 and 146 have three phases of operation as follows:

1. The channeled portions 148 and 152 having the vanes of large curvature positioned in the power transmitting fluid circuit to operate the device as a torque converter to transmit power with high torque multiplication.

2. The auxiliary guide wheel member 146 may be shifted to the right as viewed in Fig. 2 to introduce the channeled portion 154 into the fluid circuit with the channeled portion 148 of the main guide wheel member 144 remaining therein to operate the device as a torque converter to transmit power at reduced torque multiplication.

3. The guide wheel member 144 may also be shifted to the right as viewed in Fig. 2 to introduce the channeled portion 150 into the power transmitting fluid circuit with the channeled portion 154 of the auxiliary guide wheel member 146 to operate the device as a fluid clutch to transmit power with substantially no torque multiplication.

This is a continuation in part of my copending application, Serial No. 364,116, filed November 22, 1940, now Patent No. 2,339,484, dated January 18, 1944, which is a continuation in part of my application, Serial No. 588,163, filed January 22, 1932, now Patent No. 2,222,618, dated November 26, 1940.

I claim:

1. A fluid transmission comprising driving and driven shafts, impeller and turbine members carried by the driving and driven shafts and cooperating to form a power transmitting fluid circuit, a stationary member associated with the driven shaft, a plurality of spaced guide wheel members each having a plurality of spaced channeled portions mounted on the stationary member for movement thereon to successively introduce one of said spaced channeled portions into the power transmitting fluid circuit to vary the torque multiplying characteristics of the device, radially extended apertured flanges interposed between the guide wheel members and stationary member whereby fluid from the fluid circuit may flow through said members to subject the guide wheel members to substantially predetermined pressures to influence the positions of the guide wheel members, an axially extended member carried by the turbine, a plurality of spaced auxiliary turbine members carried by said axially extended member and each having a plurality of spaced channeled portions to vary the energy absorbing characteristics of the device, and radially extended apertured flanges between the auxiliary turbine members and said axially extended member whereby fluid from the power transmitting fluid circuit may subject said members to predetermined pressures influencing the position of the auxiliary turbine members.

2. In a fluid transmission a driving shaft having main and auxiliary impeller members, a driven shaft aligned with the driving shaft and having main and auxiliary turbine members cooperating with the impeller members to form a power transmitting fluid circuit, motion transmitting means between the main and auxiliary tupeller and turbine members controlling the position of the auxiliary impeller and turbine members relative to the power transmitting fluid circuit, radially extended apertured flanges between the auxiliary impeller and turbine members and the main impeller and turbine members respectively whereby the auxiliary members may be subjected to substantially predetermined fluid pressure influencing their position relative to the fluid circuit, and yielding means between the auxiliary impeller and turbine members and the main impeller and turbine members, the position of the auxiliary impeller and turbine members being controlled jointly by fluid reaction in the power transmitting fluid circuit, inertia forces developed by rotation of the impeller and turbine assemblies and the yielding means interposed between the auxiliary and main impeller and turbine members.

3. In a fluid transmission a driving shaft having an impeller, a driven shaft having a turbine cooperating with the impeller to form a power transmitting fluid circuit, a stationary member, a guide wheel member carried by the stationary member and having a plurality of spaced channeled portions adapted to be introduced into the fluid circuit to operate the device as a torque converter or as a fluid clutch, axially extending projections carried by the impeller and turbine members, auxiliary impeller and turbine members carried by said projections and each having a plurality of spaced channeled portions adapted to be introduced by fluid reaction into the fluid circuit to vary the fluid deflecting characteristics of the device when operating as a torque converter or as fluid clutch, radially extended apertured members interposed between the auxiliary impeller and turbine members and said projections whereby fluid from the power transmitting fluid circuit may flow through said members to exert fluid pressure on opposite sides of said members to influence the position of the auxiliary impeller and turbine members.

4. In a fluid transmission a driving shaft having main and auxiliary impeller members, a driven shaft having main and auxiliary turbine members cooperating with the impeller members to form a power transmitting fluid circuit, the auxiliary impeller and turbine members controlled by fluid reaction each having a plurality of spaced channeled portions, motion transmitting means between the main and auxiliary impeller and turbine members assisting the fluid reaction for controlling the position of the auxiliary impeller and turbine members relative to the power transmitting fluid circuit, radially extended apertured flanges between the auxiliary impeller and turbine members and the main impeller and turbine members respectively whereby the auxiliary members may be subjected to substantially predetermined fluid pressures influencing their position relative to the fluid circuit, the position of the auxiliary impeller and turbine members being controlled jointly by fluid reaction in the power transmitting fluid circuit and fluid pressure exerted on said flanges.

5. A fluid transmission comprising driving and driven shafts, impeller and turbine members carried by the driving and driven shafts and cooperating to form a power transmitting fluid circuit, a stationary member associated with the driven shaft, a plurality of spaced guide wheel members each having a plurality of spaced channeled portions mounted on the stationary member for movement thereon to successively introduce one of said spaced channeled portions into the power transmitting fluid circuit to vary the torque multiplying characteristics of the device, and radially extended apertured flanges interposed between the guide wheel members and stationary member whereby fluid from the fluid circuit may flow through said members to subject the guide wheel members to substantially predetermined pressures to influence the positions of the guide wheel members.

JOSEPH JANDASEK.